United States Patent
Humair et al.

(10) Patent No.: US 12,259,687 B2
(45) Date of Patent: Mar. 25, 2025

(54) UNIDIRECTIONAL CLUTCH WHEEL ASSEMBLY, IN PARTICULAR FOR HOROLOGY

(71) Applicant: PATEK PHILIPPE SA GENEVE, Geneva (CH)

(72) Inventors: Pascal Humair, Geneva (CH); Jean-Baptiste Le Bris, Marignier (FR)

(73) Assignee: PATEK PHILIPPE SA GENEVE, Geneva (CH)

( * ) Notice: Subject to any disclaimer, the term of this patent is extended or adjusted under 35 U.S.C. 154(b) by 400 days.

(21) Appl. No.: 17/776,534

(22) PCT Filed: Nov. 9, 2020

(86) PCT No.: PCT/IB2020/060506
§ 371 (c)(1),
(2) Date: May 12, 2022

(87) PCT Pub. No.: WO2021/094889
PCT Pub. Date: May 20, 2021

(65) Prior Publication Data
US 2022/0382216 A1  Dec. 1, 2022

(30) Foreign Application Priority Data
Nov. 13, 2019  (EP) ..................... 19208918

(51) Int. Cl.
*G04B 11/00* (2006.01)
*F16D 41/18* (2006.01)

(52) U.S. Cl.
CPC ............ *G04B 11/006* (2013.01); *F16D 41/18* (2013.01)

(58) Field of Classification Search
CPC ............... G04B 11/006; F16D 41/18
See application file for complete search history.

(56) References Cited

U.S. PATENT DOCUMENTS 2,563,112 A * 8/1951 Hill ..................... G04B 3/06
                                                      968/36
2,739,682 A   3/1956 Detwiler
(Continued)

FOREIGN PATENT DOCUMENTS

CH       116874    10/1926
CH       541 741    9/1973
(Continued)

OTHER PUBLICATIONS

International Preliminary Examination Report for PCT/IB2020/060506 dated Jan. 27, 2022, 5 pages.
(Continued)

*Primary Examiner* — Edwin A. Leon
*Assistant Examiner* — Sean R Brannon
(74) *Attorney, Agent, or Firm* — NIXON & VANDERHYE

(57) ABSTRACT

Disclosed is a unidirectional clutch wheel assembly that includes a first wheel, a second wheel coaxial with the first wheel and including an inner toothing, a rigid drive member rotationally fixed with respect to the first wheel and at least one rigid pawl connected to the rigid drive member by an elastic strip. The rigid pawl is locked against the inner toothing by the rigid drive member to rotationally fix the first and second wheels to each other when the first wheel or the second wheel is rotationally driven in a direction corresponding to coupling. The inner toothing has asymmetrical teeth. The rigid pawl is arranged, in its position locked against the inner toothing, to be in point contact, in top plan view, with two consecutive teeth of the inner toothing and with the rigid drive member.

21 Claims, 2 Drawing Sheets

(56) References Cited

U.S. PATENT DOCUMENTS

| | | | | |
|---|---|---|---|---|
| 3,200,918 | A | | 8/1965 | Horn |
| 3,589,486 | A | | 6/1971 | Kelch |
| 3,910,557 | A | * | 10/1975 | Merriman ............ B66D 1/7431 |
| | | | | 254/374 |
| 4,401,006 | A | * | 8/1983 | Sekiguchi ................ G10F 1/06 |
| | | | | 74/577 M |
| 5,088,581 | A | * | 2/1992 | Duve ...................... F16D 41/18 |
| | | | | 192/107 M |
| 5,452,906 | A | | 9/1995 | Huff et al. |
| 5,522,489 | A | * | 6/1996 | Savkar ................. F16D 41/064 |
| | | | | 192/41 R |
| 5,690,202 | A | * | 11/1997 | Myers ..................... F16D 41/12 |
| | | | | 74/577 M |
| 6,148,979 | A | * | 11/2000 | Roach ..................... F16D 43/16 |
| | | | | 74/577 M |
| 7,384,190 | B2 | * | 6/2008 | Zimmermann .......... G04B 3/06 |
| | | | | 368/308 |
| 8,337,077 | B2 | * | 12/2012 | Giacobino ........... G04B 11/006 |
| | | | | 368/147 |
| 2002/0056602 | A1 | * | 5/2002 | Aurora .................. F16D 41/063 |
| | | | | 192/46 |
| 2011/0299366 | A1 | * | 12/2011 | Giacobino .............. F16D 41/18 |
| | | | | 192/45.1 |
| 2015/0096859 | A1 | * | 4/2015 | Isoda .................... F16D 41/105 |
| | | | | 192/15 |

FOREIGN PATENT DOCUMENTS

| | | |
|---|---|---|
| EP | 2 392 975 | 12/2011 |
| EP | 3 489 766 | 5/2019 |
| JP | 62-66696 | 4/1987 |

OTHER PUBLICATIONS

International Search Report and Written Opinion of the ISA for PCT/IB2020/060506 dated Jan. 28, 2021, 10 pages.

* cited by examiner

UNIDIRECTIONAL CLUTCH WHEEL ASSEMBLY, IN PARTICULAR FOR HOROLOGY

CROSS-REFERENCE TO RELATED APPLICATIONS

This application is the U.S. national phase of International Application No. PCT/IB2020/060506 filed Nov. 9, 2020 which designated the U.S. and claims priority to EP Patent Application No. 19208918.3 filed Nov. 13, 2019, the entire contents of each of which are hereby incorporated by reference.

BACKGROUND OF THE INVENTION

Field of the Invention

The present invention relates to a unidirectional clutch wheel assembly, i.e. a wheel assembly comprising two coaxial wheels and a device arranged to rotationally fix these two wheels to each other in one direction and to allow relative rotation of these two wheels in the opposite direction.

Description of the Related Art

In such a clutch wheel assembly, it is important that the torque transmitted between the two wheels when they rotate together can be high and that, conversely, the resistive torque between the two wheels when they are free to rotate with respect to each other is as low as possible, even zero.

To this end, patent CH 541741 proposes to fix the two wheels together in the coupling direction via pawls connected by U-shaped elastic strips to a rigid drive part rotationally fixed with respect to one of the two wheels, the said pawls being locked in an inner toothing of the other wheel directly by the rigid drive part when the wheel assembly is in the coupled state. A disadvantage of this clutch wheel assembly is that the contacts between the pawls, the inner toothing and the rigid drive part cannot be effectively controlled, whether in the coupling direction or in the uncoupling direction, which can disrupt the operation and make it very sensitive to manufacturing and assembly tolerances as well as to the state of wear of the parts.

Another unidirectional clutch wheel assembly, intended in particular for a timepiece mechanism such as a manual and automatic winding mechanism, is described in patent EP 2392975 by the applicant. It comprises an inner toothing with wolf teeth on one of the wheels and C-shaped elastic pawls rotationally fixed with respect to the other wheel, the free end of which in the rest position is located on a circumference, the diameter of which is larger than a circumference passing through the tip of the wolf teeth and smaller than a circumference passing through the bottom of said teeth. Owing to this arrangement of the pawls, the pawls are only in contact with the inner toothing for some of the time during uncoupling, which reduces or cancels the resistance torque. On the other hand, in the coupling direction the free end of the pawls is deformed elastically outwards to bear against the bottom of the toothing, thereby causing the pawls to work in compression. The torque transmitted between the two wheels can be high but is limited by the risk of buckling of the pawls.

SUMMARY OF THE INVENTION

The present invention aims to overcome, at least in part, the aforementioned disadvantages and to this end proposes a unidirectional clutch wheel assembly as disclosed and claimed, a timepiece mechanism comprising same and a timepiece comprising the timepiece mechanism.

BRIEF DESCRIPTION OF THE DRAWINGS

Other features and advantages of the present invention will become clear upon reading the following detailed description given with reference to the attached drawings in which.

DESCRIPTION OF THE PREFERRED EMBODIMENTS

Although other applications are of course possible, the unidirectional clutch wheel assembly in accordance with the invention is typically used in a mechanism of a timepiece, for example a manual and automatic winding mechanism such as that shown in FIG. 10 of patent EP 2392975, or a striking mechanism. The timepiece is typically a wristwatch or a pocket watch.

Figure 1:
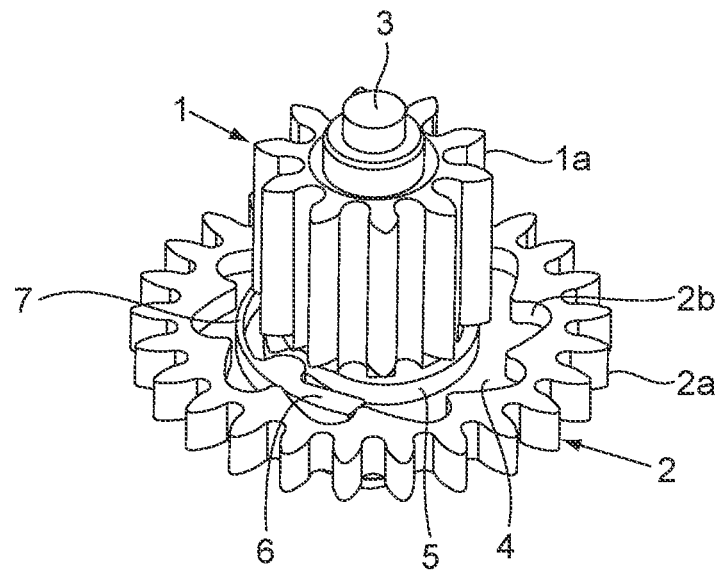
FIG. 1 is a perspective view of a unidirectional clutch wheel assembly in accordance with one particular embodiment of the invention.
Figure 2:
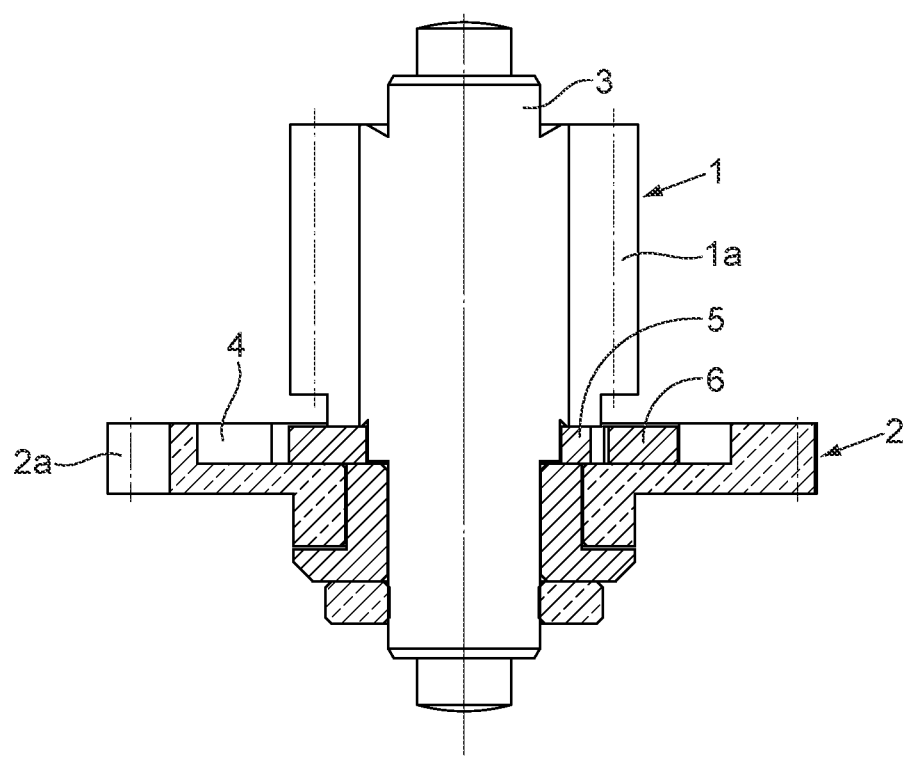
FIG. 2 is an axial sectional view of the unidirectional clutch wheel assembly illustrated in FIG. 1.
Figure 3:
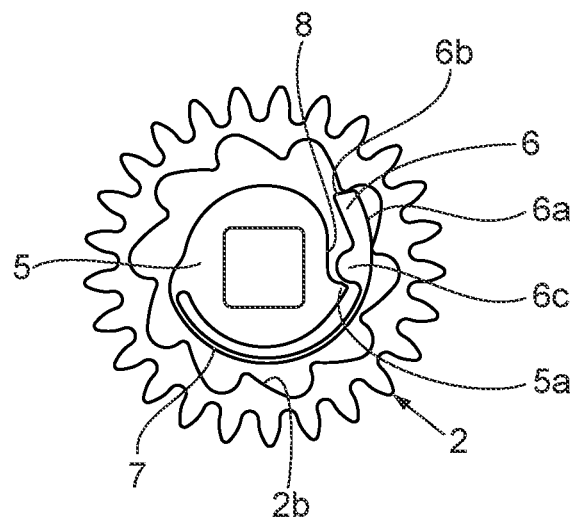
FIGS. 3 to 5 are top plan views of part of the clutch wheel assembly illustrated in FIG. 1 showing this wheel assembly in a rest state, in a coupling mode and in an uncoupling mode respectively; in these figures a first wheel and a shaft of the clutch wheel assembly have not been shown for reasons of clarity.
Figure 4:
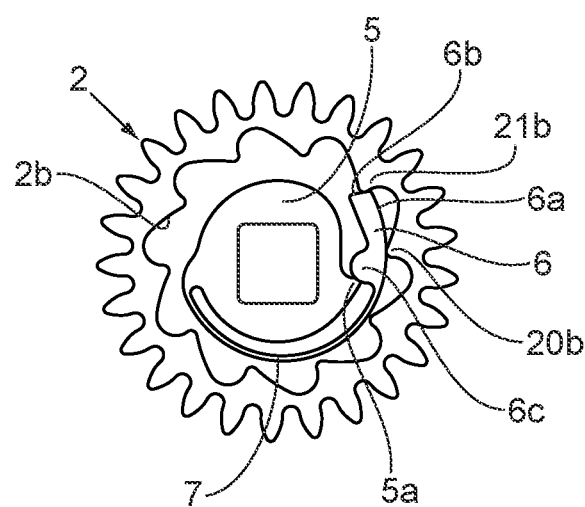
Figure 5:
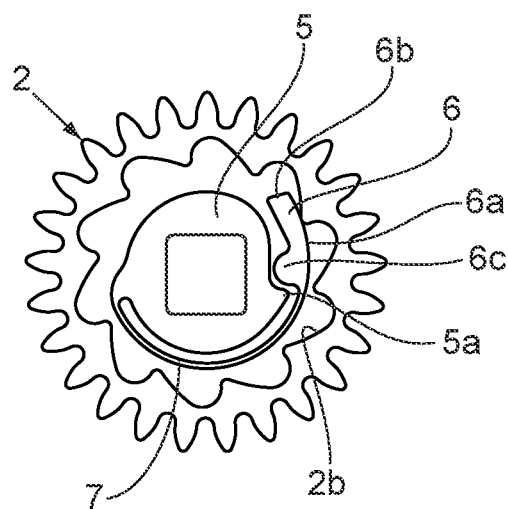

In the embodiment shown in FIGS. 1 to 5, the unidirectional clutch wheel assembly in accordance with the invention comprises a first wheel 1, shown here as a pinion, and a second wheel 2 which is coaxial with the first wheel 1. The first wheel 1 is fixed relative to a shaft 3 and is preferably made in one piece with this shaft. The second wheel 2 is pivoted freely on the shaft 3. The first and second wheels 1, 2 each have an outer toothing 1a, 2a. The second wheel 2 also has an inner toothing 2b with asymmetric teeth. The inner toothing 2b delimits a housing 4 in which there is located a rigid drive member 5 fixedly mounted around the shaft 3. In this same housing 4, a rigid pawl 6 is connected to the rigid drive member 5 by a C-shaped elastic strip 7, the rigid pawl 6, the elastic strip 7 and the rigid drive member 5 being preferably made in one piece as shown.

The rigid pawl 6 is thereby coplanar with the inner toothing 2b and can cooperate therewith to operate the unidirectional clutch wheel assembly in a coupling mode or uncoupling mode. When the first wheel 1 is rotated in a first direction, corresponding to the anti-clockwise direction in FIGS. 3 to 5, the rigid pawl 6 is locked directly by the rigid drive member 5 against the inner toothing 2b (cf. FIG. 4), thereby causing the second wheel 2 to rotate with the first wheel 1. This is the coupling mode, which can be likewise obtained in the opposite manner by rotating the second wheel 2 in a second direction, opposite the first direction, to drive the first wheel 1 therewith. When the first wheel 1 is rotated in the second direction, corresponding to the clockwise direction in FIGS. 3 to 5, the rigid pawl 6 driven by the rigid drive member 5 via the elastic strip 7 disengages (cf. FIG. 5), allowing the second wheel 2 to remain immobile. This is the uncoupling mode, which can be likewise obtained in the opposite manner by rotating the second wheel 2 in the first direction, to leave the first wheel 1 free.

As shown in the drawings, the rigid pawl 6 has a convex outer face 6a with a large radius of curvature extending the outer face of the C-shaped elastic strip 7, a planar end face 6b and an inner face having a rounded protuberance 6c. In the coupling mode, the convex outer face 6a is in point contact (in top plan view) with the rounded tip of a tooth 20b of the inner toothing 2b, the planar end face 6b is in point contact with the rounded tip of an adjacent tooth 21b of the inner toothing 2b and the rounded protuberance 6c is in point contact with a beak 5a of the rigid drive member 5, the force applied to the rigid pawl 6 by the rigid drive member 5 at the point of contact between the beak 5a and the rounded protuberance 6c being directed outwardly so that the rigid pawl 6 cannot leave the inner toothing 2b. In this coupling mode, the rigid pawl 6 operates in compression, in contrast to conventional clutches which operate in traction. This allows a much greater torque to be transferred and the elastic strip 7 to be rendered completely inactive so that it is non-operational. A notch 8 formed in the rigid drive member 5 in the immediate proximity of the beak 5a serves as a clearance for the rounded protuberance 6c during the disengaging of the rigid pawl 6 in the uncoupling mode.

These point contacts between the rigid pawl 6, the inner toothing 2b and the rigid drive member 5 render the unidirectional clutch wheel assembly very precise in terms of its design and operation and less sensitive to manufacturing and assembly tolerances as well as to the state of wear of its components. Owing to the direct cooperation between the rigid drive member 5 and the rigid pawl 6 in the coupling mode, the transmitted torque can be very high. Moreover, the elastic strip 7 is not pre-stressed during assembly of the rigid drive member 5 and it does not act in the transmission of torque, i.e. advantageously it does not come into contact with any tooth of the inner toothing 2b, or at most with one tooth. In other words, only the rigid pawl 6 is operational in contact with the rigid drive member 5 in the coupling mode. Therefore, the elastic strip 7 can have a low stiffness allowing the rigid pawl 6 to disengage with little or no friction in the uncoupling mode.

The present invention is not limited to the shape of the inner toothing and to the shape of the rigid pawl shown in the figures. It goes without saying that numerous shapes may be envisaged to obtain the three point contacts allowing the rigid pawl to be locked against the inner toothing.

Furthermore, the unidirectional clutch wheel assembly could have several rigid pawls, for example three rigid pawls, uniformly distributed around the shaft 3 and each connected to the rigid drive member 5 by an elastic strip, and several corresponding beaks on the rigid drive member 5.

The invention claimed is:

1. A unidirectional clutch wheel assembly comprising a first wheel, a second wheel coaxial with the first wheel and comprising an inner toothing, a rigid drive member rotationally fixed with respect to the first wheel and at least one rigid pawl connected to the rigid drive member by an elastic strip, the rigid pawl being locked against the inner toothing by the rigid drive member to rotationally fix the first and second wheels to each other when the first wheel or the second wheel is rotationally driven in a direction corresponding to coupling, wherein the inner toothing has asymmetrical teeth and wherein the rigid pawl is arranged, in position locked against the inner toothing, to have, in top plan view, a single point of contact with a first tooth of two consecutive teeth of the inner toothing, a single point of contact with a second tooth of the two consecutive teeth, and a single point of contact with the rigid drive member.

2. The unidirectional clutch wheel assembly as claimed in claim 1, wherein the rigid pawl is arranged such that the point contact between the rigid pawl and a first tooth of said two consecutive teeth is effected between an outer convex face of the pawl and a rounded tip of said first tooth.

3. The unidirectional clutch wheel assembly as claimed in claim 2, wherein the rigid pawl is arranged such that the point contact between the rigid pawl and a second tooth of said two consecutive teeth is effected between a planar end face of the rigid pawl and a rounded tip of said second tooth.

4. The unidirectional clutch wheel assembly as claimed in claim 2, wherein the rigid pawl is arranged such that the point contact between the rigid pawl and the rigid drive member is effected between a rounded protuberance of an inner face of the rigid pawl and a beak of the rigid drive member.

5. The unidirectional clutch wheel assembly as claimed in claim 2, wherein the elastic strip is not in contact with the inner toothing, or is in contact with only one tooth of the inner toothing, when the rigid pawl is in the position of being locked against the inner toothing.

6. A timepiece mechanism comprising a unidirectional clutch wheel assembly as claimed in claim 2.

7. The unidirectional clutch wheel assembly as claimed in claim 1, wherein the rigid pawl is arranged such that the point contact between the rigid pawl and a second tooth of said two consecutive teeth is effected between a planar end face of the rigid pawl and a rounded tip of said second tooth.

8. The unidirectional clutch wheel assembly as claimed in claim 7, wherein the rigid pawl is arranged such that the point contact between the rigid pawl and the rigid drive member is effected between a rounded protuberance of an inner face of the rigid pawl and a beak of the rigid drive member.

9. The unidirectional clutch wheel assembly as claimed in claim 7, wherein the elastic strip is not in contact with the inner toothing, or is in contact with only one tooth of the inner toothing, when the rigid pawl is in the position of being locked against the inner toothing.

10. A timepiece mechanism comprising a unidirectional clutch wheel assembly as claimed in claim 7.

11. The unidirectional clutch wheel assembly as claimed in claim 1, wherein the rigid pawl is arranged such that the point contact between the rigid pawl and the rigid drive member is effected between a rounded protuberance of an inner face of the rigid pawl and a beak of the rigid drive member.

12. The unidirectional clutch wheel assembly as claimed in claim 11, wherein the rigid drive member comprises a notch serving as a clearance for the rounded protuberance during disengaging of the rigid pawl when the first wheel or the second wheel is rotationally driven in a direction corresponding to uncoupling.

13. The unidirectional clutch wheel assembly as claimed in claim 12, wherein the elastic strip is not in contact with the inner toothing, or is in contact with only one tooth of the inner toothing, when the rigid pawl is in the position of being locked against the inner toothing.

14. A timepiece mechanism comprising a unidirectional clutch wheel assembly as claimed in claim 12.

15. The unidirectional clutch wheel assembly as claimed in claim 11, wherein the elastic strip is not in contact with the inner toothing, or is in contact with only one tooth of the inner toothing, when the rigid pawl is in the position of being locked against the inner toothing.

16. A timepiece mechanism comprising a unidirectional clutch wheel assembly as claimed in claim 11.

17. The unidirectional clutch wheel assembly as claimed in claim 1, wherein the elastic strip is not in contact with the inner toothing, or is in contact with only one tooth of the inner toothing, when the rigid pawl is in the position of being locked against the inner toothing.

18. A timepiece mechanism comprising a unidirectional clutch wheel assembly as claimed in claim 17.

19. A timepiece mechanism comprising a unidirectional clutch wheel assembly as claimed in claim 1.

20. A timepiece comprising a timepiece mechanism as claimed in claim 19.

21. A unidirectional clutch wheel assembly comprising a first wheel, a second wheel coaxial with the first wheel and comprising an inner toothing, a rigid drive member rotationally fixed with respect to the first wheel and at least one rigid pawl connected to the rigid drive member by an elastic strip, the rigid pawl being locked against the inner toothing by the rigid drive member to rotationally fix the first and second wheels to each other when the first wheel or the second wheel is rotationally driven in a direction corresponding to coupling, wherein the inner toothing has asymmetrical teeth and wherein the rigid pawl is arranged, in position locked against the inner toothing, to be in point contact, in top plan view, with two consecutive teeth of the inner toothing and with the rigid drive member, wherein the rigid pawl is arranged such that the point contact between the rigid pawl and the rigid drive member is effected between a rounded protuberance of an inner face of the rigid pawl and a beak of the rigid drive member, and wherein the rigid drive member comprises a notch serving as a clearance for the rounded protuberance during disengaging of the rigid pawl when the first wheel or the second wheel is rotationally driven in a direction corresponding to uncoupling.

* * * * *